July 23, 1968

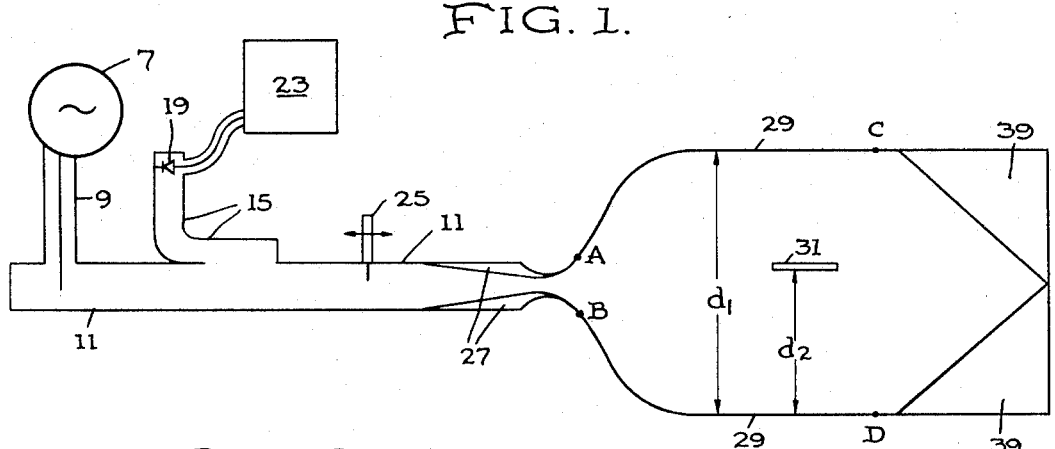
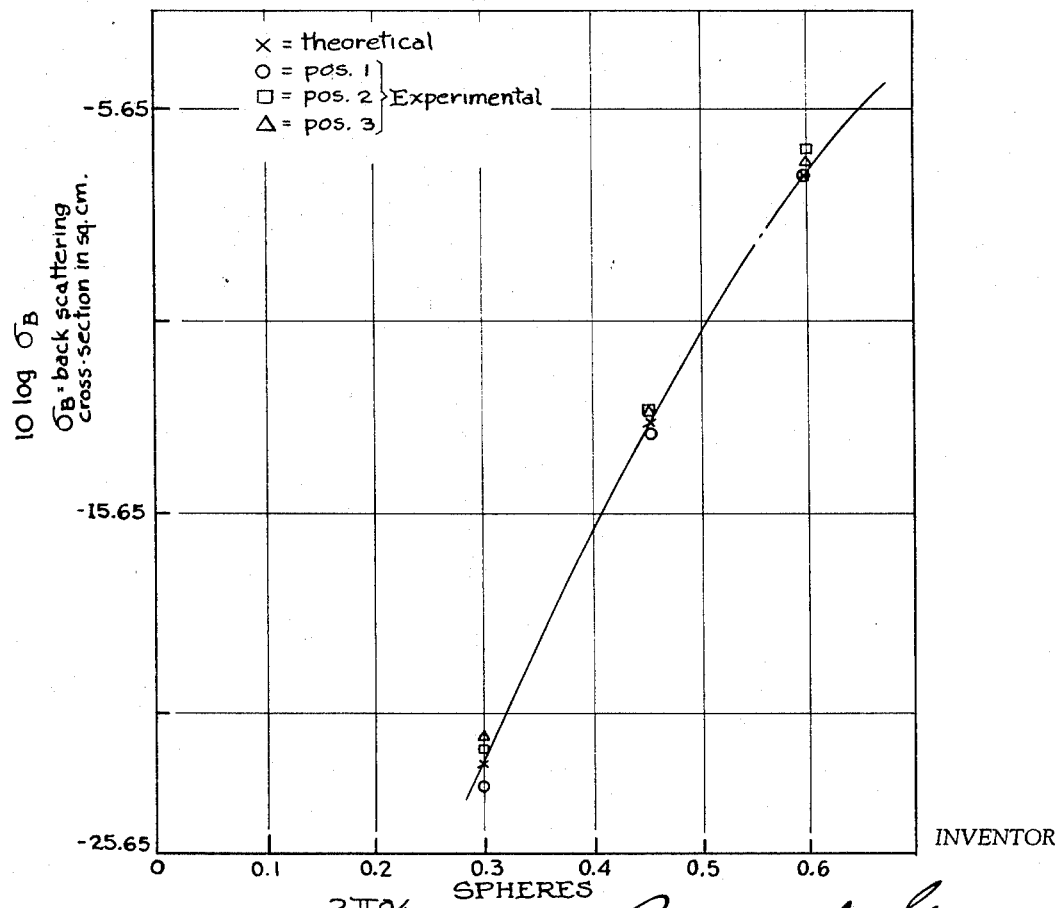

M. J. GANS 3,394,306

TRANSMISSION LINE SCATTERING RANGE UTILIZING DIRECTIONALLY
CONTROLLED UNRADIATED WAVE GUIDING FOR MEASURING
REFLECTIVE WAVE PROPERTIES

Filed Aug. 3, 1964

INVENTOR
Michael J. Gans
BY Edwin E. Greigg
ATTORNEY

United States Patent Office 3,394,306
Patented July 23, 1968

3,394,306
TRANSMISSION LINE SCATTERING RANGE UTILIZING DIRECTIONALLY CONTROLLED UNRADIATED WAVE GUIDING FOR MEASURING REFLECTIVE WAVE PROPERTIES
Michael J. Gans, Walnut Creek, Calif., assignor to MB Associates, a corporation of California
Filed Aug. 3, 1964, Ser. No. 386,962
2 Claims. (Cl. 324—58)

ABSTRACT OF THE DISCLOSURE

An apparatus for determining the electromagnetic wave reflectivity of an object wherein the projected and reflected radio waves are guided along spaced conductors in order to establish a uniform field surrounding the object to be measured. The reflected waves are guided by the spaced conductors to a measuring means.

---

This invention relates to a radio wave scattering range, and moreparticularly, to a radio wave scattering range for guiding electromagnetic waves in such a way that the radio wave reflectivity of targets is determined.

The need for investigating the radio wave reflective properties of various objects is great (for instance, in order to predict their effectiveness as radio wave deception devices). Theoretical predictions of the reflectivity of the vast number of possible combinations of materials and shapes is impractical. The determination of the reflectivity amplitude and phase as a function of aspect angle, polarization and radio wave length further complicates the task, making it virtually impossible.

Empirical measurements, then, are the most effective tool for studying the reflective properties of radio wave decoys. In the past these measurements have been made by a variety of devices all of which work on essentially the same principal, that is, projecting microwave waves into unrestrained or free space toward the radio wave scattering device. These waves are reflected back to the receiving device. The measurement made is the difference between signal when no object is present and when an object is present (the object scatters or reflects the incident waves). The wave is usually launched from a "horn," a device used to project waves from a wave guide, and once launched experiences great attenuation as it proceeds to the target. The signal strength is proportional to $1/4\pi r^2$ both for the projected waves and for the reflected waves from the scatterer. Thus, the power of the signal received from the scattering device is proportional to $1/r^4$ where $r$ is the distance to the scatterer. Moreover, it is imperative that in such devices that the projector must be located a substantial distance from the scatterer (for field distance requirement), resulting in significant degradation in the reliability of measurements. This stand-off distance or far field distance requirement of the projector and scatterer may be several feet, depending on the wave length of the incident wave and target size. If scatterers are placed closer to the projector, reflected waves will reach the outer portions of the projector-receiver horn far enough in advance of the portion of the wave reaching the throat of the horn that the signal will be out of phase. The $1/r^4$ diminution of signal strength, then, is a serious problem which is complicated if relatively small scatterers are to be measured. For small scatterers the signal received is, of course, very small and in free space scattering ranges very difficult to detect over the noise or spurious signals inherent in these ranges.

At least two other problems are inherent in systems which project microwaves toward a target. First, mounting devices must be relatively complex in an attempt to minimize their interaction with the target in order to produce reliable measurements. Second, relatively vast quantities of radio wave absorptive materials must be mounted behind the target to prevent spurious signals. This absorbent must be firmly mounted or changes in its position during testing will influence results. This requirement means that free space ranges are inherently larger, more complicated and more expensive than the present system. Free space systems, for example, are too large and complicated to be placed in a vacuum chamber to simulate outer atmospheric conditions.

It is, therefore, an object of the present invention to avoid the aforementioned problems by measuring directly the free space reflectivity properties of scatterers.

Another object of the present invention is to provide a radio wave scattering range in which no wave attenuation results.

Still another object of the present invention is to provide a radio wave reflectivity measuring device which is more accurate than previous devices and which may effectively measure the reflectivity of small targets as well as large target.

In accordance with an aspect of the present invention, therefore, the projected and reflected radio waves are guided so as to be concentrated on the target. The waves are directionally controlled by a transmission means; consequently there is no power spreading or attenuation of the waves by the $1/r^4$ factor, as previously mentioned, and measurements anywhere along the range are the same.

Further, the scatterer's position or aspect to the incident or projected wave may be easily varied to study the reflective properties of the target from all angles. Two sets of transmission means in the form of lines may be employed which guide waves mutually perpendicularly to one another, thereby enabling the study of polarization effects on reflectivity. Similarly the phase of reflections can be easily measured, since the scatterer may be placed closer to the phase measuring bridge than in freespace scattering ranges because there is no far field distance requirement.

While the present invention may employ a two wire transmission line, it also contemplates the use of a surface wave guide such as a dielectric slab or rod. The same controlled or unradiated wave guiding advantages would accrue by using a surface wave guide, that is, wave attenuation and power losses can be greatly reduced. The scatterer may be located anywhere along the wave guide as long as the field is substantially uniform over the volume of the scatterer.

Still another valuable scattering measurement can be made using guided or unradiated waves. The bistatic or differential radio wave scattering cross-section can be easily measured. Free space systems must project a wave and then measure the scatterer at some angle, $\theta$, known as the bistatic angle. As the free space waves are not guided, great care must be taken that the receiving radio waves do not receive directly from the transmitter instead of the reflected or scattered waves. The noise in such a system is high. In the guided wave system of the present invention bistatic cross-sections are easily measured. The receiving transmission line will only measure scattered waves snce the transmitted waves are guided and do not radiate; thus, a high signal to noise ratio is possible.

Other objects and advantages of the present invention will be apparent from the following detailed description with reference to the appended drawings in which:

FIG. 1 is a circuit diagram of one suitable means of constructing a transmission line scattering range;

FIG. 2 is a graph of experimental results found using the configuration of FIG. 1 to measure the radio wave reflectivity of three small metal spheres;

Figure 3:
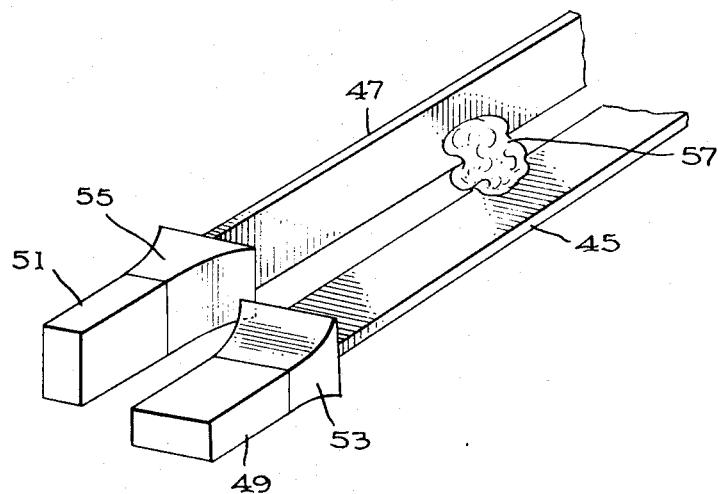
FIG. 3 illustrates the use of dielectric slabs which are perpendicularly oriented to each other in order to allow polarized measurements of scattering.

In FIG. 1 there is shown the signal or wave generator 7, adapted to the wave guide 11 by the coaxial cable 9. The generated wave proceeds down the guide 11 and past the directional coupler 15. A tuner 25 protrudes into the wave guide 11 whereby the spurious signals may be balanced out before measuring the scattering properties of the body. A tapered transition 27 to the transmission line 29 is provided at the end of the wave guide 11. The transmission lines 29, for example, were made of #10 AWG copper wire although other sizes are equally suitable, as well as other shaped conductors (bus bars, etc.).

The distance $d_1$, between the transmission lines 29, and distance $d_2$, between the scatterer 31 and the transmission line 29 must be kept above minimum values. These minimum values are determined by the following requirement. The field of the transmission line must be uniform over the volume into which the scatterer is placed, and the recoupling between the transmission line and the scatterer must be negligible. In the system described below, the distance $d_2$ should not be less than $\lambda/8$ or there may result a recoupling (where $\lambda$ is the free space wavelength of the signal).

That portion of the wave not reflected proceeds down the transmission lines 29 and is absorbed by the tapered resistance cards 39 or by similar apparatus. The portion of the wave impinging on scatterer 31 produces a reflected wave which returns back down the transmission line 29 into the wave guide 11 and directional coupler 15. The directional coupler 15 guides the reflected wave to the crystal 19 which detects its strength and allows it to be read out or measured and recorded on the receiver 23. Various receivers 23 can be used, for example an oscilloscope and "Polaroid" camera.

The operation and advantages of this system can be demonstrated by comparing results obtainable with the above system and that obtained by previous systems. Measurement of the scattering properties of three small spheres is shown in FIG. 2. The waves studied were X-band (wave length range of 5.8 to 2.4 centimeters) radio waves with a wavelength of 3.0 centimeters.

In order to compare the signal strength received from the scattering field in free space systems and in the present two line system, the reciprocity theorem may be employed:

$$V = C \iint \underline{E} \cdot \underline{J} \vartheta s$$

where C is a constant, E=field when scatterer is absent, J=current distribution on the scatterer. This relationship illustrates that since the incident electric field (and therefore the current distribution on the scatterer) are functionally the same, but may differ in level, then the voltages received for free space or previous ranges and the two wire system will be related by the same constant multiplicative factor for all scatterers. The following analysis serves as an example of the sensitivity of the transmission line range.

For the two wire system with the distance between lines 29 equal to 0.59 inch, the diameter of the wires equal to 0.10 inch and a total power carried by the transmission line of 1 watt, the power incident is $6.48 \times 10^3$ watts/m.$^2$.

While in image plane free space range with 1 watt total power, a horn aperture of 10.15 cm. and a wavelength $\lambda = 3.0$ cm., the power incident is 24.2 watts/m.$^2$ The ratio between the two received voltages is 267 and the signal power advantage is db (signal power) $= 20 \log_{10} 267 = 48.5$ db As may be seen from FIG 2, the accuracy resulting from the transmission line method is extremely good.

Referring now to FIG. 3, there is shown a guided wave apparatus suitable for polarized measurements of reflectivity of objects. By placing two transmission lines with the same axis but rotated 90° with respect to each other, it is possible to impress any polarization on the target by controlling the relative phase and amplitudes of the incident waves on the two transmission lines. Also the reflected signals received on each of the lines allow the complete scattering range for the target to be determined. Employed in the FIG. 3 embodiment are two dielectric slabs 45 and 47 which are perpendicularly disposed to each other. The same results can be obtained using conductors as was illustrated in FIG. 1, dielectric rods or other shapes and transmission line combinations. The dielectric slabs 45 and 47 guide waves which are projected onto the slabs from the wave guides 49 and 51 by the horns 53 and 55. These projected waves create fields which are perpendicular to each other, thus enabling the measurement of polarized back scattering (the horns 53 and 55 also receive reflected waves). The projected waves may also be launched in an out-of-phase relationship to further investigate the reflective properties.

Figure 4:
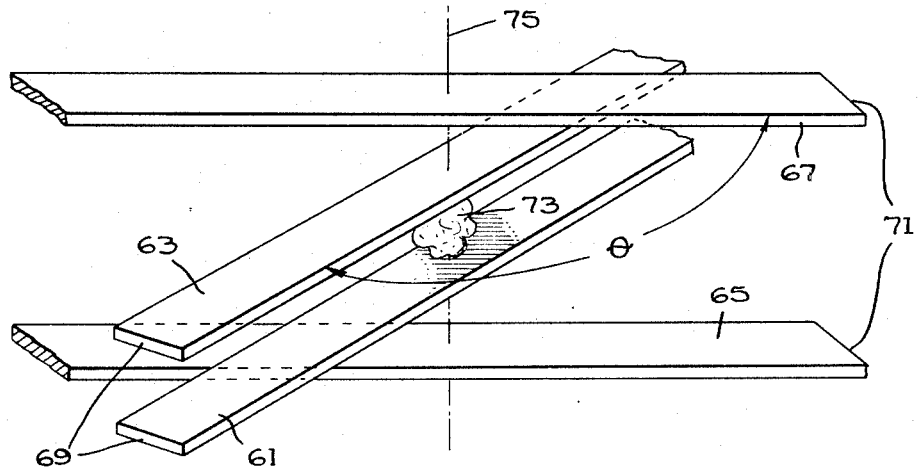
FIG. 4 illustrates the use of bus bar conductors as transmission lines, which allows the measurement of bistatic cross-sections.

FIG. 4 illustrates apparatus suitable for measuring bistatic radio wave cross-sections. It is very simple to measure the forward cross-section of a target on a transmission line scattering range by merely constructing the output of the transmission line the same as its input and feeding into a receiver. In conventional ranges it is difficult to make bistatic measurements because the coupling from the transmitter to the receiver varies with angle even with the target absent. This variation is difficult to separate from the variation of target cross-section with bistatic angle. Since the field is concentrated on the target in the transmission line scattering range, it is possible to make the receiving transmission line wide spaced and thereby have negligible coupling between the two lines with the target absent. When the target is inserted, the receiving transmission line will pick up a signal due mostly to the differential cross-section of the target in the direction of the axis of the receiving transmission line. The receiving transmission line may then be rotated around the target and its variation in signal will be due and proportional to the variation in target cross-section with bistatic angle. Theer are shown two transmission lines which here are bus bar parallel conductors. As illustrated, the transmission line composed of 61 and 63 is the sending or projecting line while the line composed of the conductors 65 and 67 is the receiver. Suitable apparatus to project and receive waves, as illustrated in FIG. 1, is attached at the ends 69 and 71, respectively. Such apparatus is described above in the description of FIG. 1. There are a number of possible combinations of measurement which could be made with this apparatus. Not only could the bistatic cross-section be measured but back and fore scattering can be measured. The angle $\theta$ can be varied with zero degrees (which is back scattering) to 180 degrees (which is fore scattering) to obtain a complete picture of the scattering properties of the object 73. The object 73 should be located substantially on the axis 75 of intersection of the two lines for best results. The use of bus bar conductors allows the measurement of very large objects, and thus the above-described techniques are suitable for accurate measurements of the scattering properties of very small and relatively large radio wave scatterers.

Although several embodiments of the invention have been depicted and described, it will be apparent that these embodiments are illustrative in nature and that a number of modifications in the apparatus and variations in its end use may be effected without departing from the spirit or scope of the invention as defined in the appended claims.

That which is claimed is:

1. In a device for determining the electromagnetic wave reflectivity of an object, the combination comprising, a wave generating means, a pair of spaced parallel wave guide dielectric slabs having mutually perpendicular faces for establishing perpendicularly related fields about said object and being connected to said generating means, said dielectric slabs surrounding said object to be measured and spaced therefrom for establishing a uniform field around said object, and means adjacent said dielectric slabs for measuring the reflected waves from said object guided by each of said dielectric slabs.

2. In a device for determining the electromagnetic wave reflectivity of an object, the combination comprising, a wave generating means, two sets of parallel spaced wave guide dielectric slabs wherein each set intersects at an axis passing through said object and being connected to said generating means, said sets of dielectric slabs surrounding said object to be measured and spaced therefrom for establishing a uniform field around said object, and means adjacent said sets of dielectric slabs for measuring the reflected waves from said object guided by each of said sets of dielectric slabs whereby the bistatic cross-section of said object can be measured.

References Cited
UNITED STATES PATENTS

| | | | |
|---|---|---|---|
| 2,611,804 | 9/1952 | Zaleski | 324—58.5 |
| 2,794,959 | 6/1957 | Fox | 324—58 X |
| 2,844,789 | 7/1958 | Allen. | |
| 2,999,982 | 9/1961 | Brousaud | 324—58.5 |
| 3,025,463 | 3/1962 | Luoma et al. | 324—58.5 |
| 3,233,172 | 2/1966 | Luoma | 324—58 |
| 3,170,128 | 2/1965 | Eason et al. | 333—21 |

RUDOLPH V. ROLINEC, *Primary Examiner.*

P. F. WILLE, *Assistant Examiner.*